(12) United States Patent
Corbett et al.

(10) Patent No.: US 8,740,472 B2
(45) Date of Patent: Jun. 3, 2014

(54) THRUST BEARING AND SUSPENSION FOR VEHICLE

(75) Inventors: Richard Corbett, Fondettes (FR); Christophe Houdayer, Semblancay (FR); Bruno Montboeuf, Cerelles (FR); Samuel Viault, Saint Antoine du Rocher (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/515,196

(22) PCT Filed: Dec. 15, 2010

(86) PCT No.: PCT/EP2010/069731
§ 371 (c)(1),
(2), (4) Date: Oct. 2, 2012

(87) PCT Pub. No.: WO2011/076626
PCT Pub. Date: Jun. 30, 2011

(65) Prior Publication Data
US 2013/0195393 A1    Aug. 1, 2013

(30) Foreign Application Priority Data
Dec. 23, 2009   (FR) ...................................... 09 59535

(51) Int. Cl.
*F16C 19/10* (2006.01)
(52) U.S. Cl.
USPC ........................................................ 384/609
(58) Field of Classification Search
USPC ......... 384/490, 510, 526, 536, 590, 592, 609, 384/611, 618; 280/124.125, 280/124.145–124.147, 124.154, 124.155
See application file for complete search history.

(56) References Cited

U.S. PATENT DOCUMENTS

| 6,558,043 B2 | 5/2003 | Beghini et al. |
| 2003/0002764 A1 | 1/2003 | Pflugner et al. |
| 2005/0247531 A1* | 11/2005 | Oota ........................ 188/322.19 |

FOREIGN PATENT DOCUMENTS

| DE | 102006003462 A1 | 7/2007 |
| FR | 2811264 A1 | 1/2002 |
| WO | WO2009030842 A1 | 3/2009 |
| WO | WO2009/106469 | * 9/2009 |

* cited by examiner

*Primary Examiner* — James Pilkington
(74) *Attorney, Agent, or Firm* — Bryan Peckjian; SKF USA Inc. Patent Department

(57) ABSTRACT

The suspension thrust bearing device for a motor vehicle comprises a rolling bearing forming a thrust bearing and provided with an upper ring, with a lower ring and with at least one row of rolling elements arranged between the rings, a bearing cap in contact with the upper ring, and a support cap in contact with the lower ring and forming a bearing means for a suspension spring. At least one of the caps comprises a body made of synthetic material and an insert covered at least in part by the body. The insert comprises stiffening ribs in order to reinforce the mechanical strength of the cap with respect to the axial loads resulting from the forces exerted by the suspension spring.

11 Claims, 17 Drawing Sheets

THRUST BEARING AND SUSPENSION FOR VEHICLE

CROSS-REFERENCE

This application is the US national stage of International Application No. PCT/EP2010/069731 filed on Dec. 15, 2010, which claims priority to French Application No. FR 0959535 filed Dec. 23, 2009.

FIELD OF THE INVENTION

The present invention relates to the field of suspension thrust bearing devices used in particular in motor vehicles in the suspension struts of the steered wheels.

BACKGROUND OF THE INVENTION

Such a suspension thrust bearing device generally comprises a rolling bearing forming an axial thrust bearing and comprising an upper ring and a lower ring between which are arranged a plurality of rolling elements, for example balls or rollers. Preferably, use is made of an angular-contact rolling bearing which makes it possible to take up both the radial forces and the axial forces exerted on the device. The upper and lower rings are generally mounted in contact with lower and upper bearing or support parts, such as cups or caps. The upper and lower caps form a housing for the rings of the rolling bearing and provide the interface between the said rings and the surrounding elements.

Such a suspension thrust bearing device is arranged in the upper part of a suspension strut between the vehicle body shell and a suspension spring. The spring is generally installed around a shock absorber piston rod, the end of which is connected to the vehicle body shell via an elastic block which filters out vibrations. The suspension spring, generally a helical spring, bears axially, directly or indirectly, on the lower bearing cap of the suspension thrust bearing device. The upper bearing cap for its part is fixed with respect to the vehicle body shell.

Such a suspension thrust bearing device makes it possible to transmit axial forces between the suspension spring and the vehicle body shell while allowing a rotational movement between the lower bearing cap and the filtering elastic block resulting from a turning of the steered wheels of the vehicle and/or from the compression of the suspension spring.

Patent applications FR-A1-2 811 264 and WO-A1-2009/030842 describe such suspension thrust bearing devices comprising a lower support cap and a rolling bearing mounted to bear against the latter. The lower support cap is made of synthetic material and comprises a metal reinforcement or reinforcing insert improving the mechanical strength of the cap with respect to the forces exerted by the suspension spring.

The reinforcing insert must be sufficiently thick in order to ensure that the cap has sufficient stiffness. Now, since the insert is made of metal material, this increases the overall weight of the lower support cap, and more generally that of the thrust bearing device.

The present invention aims to overcome this disadvantage.

SUMMARY OF THE INVENTION

More particularly, the present invention aims to provide a suspension thrust bearing device which is economical, which is of simple design, which is easy to manufacture, which is of reduced weight and which has an improved mechanical strength in particular with respect to the forces exerted by the suspension spring.

In one embodiment, a suspension thrust bearing device for a motor vehicle comprises a rolling bearing forming a thrust bearing and provided with an upper ring, with a lower ring and with at least one row of rolling elements arranged between the rings, a bearing cap in contact with the upper ring, and a support cap in contact with the lower ring and forming a bearing means for a suspension spring. At least one of the said caps comprises a body made of synthetic material and an insert covered at least in part by the body. The insert comprises stiffening ribs in order to reinforce the mechanical strength of the said cap with respect to the axial loads resulting from the forces exerted by the suspension spring or by a shock-absorbing pad designed to bear directly or indirectly against the support cap.

The ribs make it possible to stiffen the cap in the regions for taking up the axial loads resulting from the forces exerted by the suspension spring and, where appropriate, exerted by the shock-absorbing pad without it being necessary to increase the overall thickness of the insert. The mechanical strength of the cap is thus increased without increasing its weight. The ribs form means for reinforcing the mechanical strength of the cap.

Preferably, the stiffening ribs extend axially in the direction of the rolling bearing. The insert may comprise a radial portion from which the stiffening ribs extend axially. The insert may also comprise an axial portion axially inwardly extending the radial portion directly or indirectly. The stiffening ribs may extend radially inwardly from the axial portion of the insert in order to reinforce the mechanical strength of the cap with respect to the forces resulting from a shock-absorbing pad. The ribs are advantageously connected to a radial or substantially radial collar extending inwardly from the axial portion.

In one embodiment, the axial portion of the insert comprises, at a lower end, an annular rim extending radially inwards. The radial portion of the insert may additionally comprise an annular peripheral rim extending axially in the direction of the rolling bearing.

Advantageously, the ribs are spaced with respect to one another in the circumferential direction, preferably in a regular manner.

In one embodiment, an internal edge of the stiffening ribs is offset radially inwardly with respect to an internal edge of the ring bearing against the body of the cap. An external edge of the ribs may also be offset radially outwards with respect to an external edge of the said ring.

In one embodiment, the support cap comprises the insert. Alternatively, or in combination, the bearing cap may also comprise a reinforcing insert comprising stiffening ribs.

In one embodiment, the insert is made of synthetic material. The synthetic material used for the reinforcing insert is of a different kind from that of the body of the cap. Making the insert of synthetic material makes it possible to have a large degree of flexibility in its production. It is for example possible to have an insert having regions of variable thickness as a function of the intensity of the mechanical stresses to be withstood. The mechanical strength of the cap is thus increased while lightening its weight with respect to a cap comprising a metal reinforcing insert. Furthermore, the manufacture of such a cap is simplified and relatively quick. After use, the cap can also be recycled easily.

Advantageously, the stiffening ribs have in cross section a profile similar to that of the surface of the cap against which the ring is mounted.

In another embodiment, the insert is made of metal material. The insert and the ribs can be obtained at reduced cost from a blank of thin metal sheet by stamping.

The insert may be entirely embedded or alternatively partially embedded in the body of the cap.

Preferably, at least one of the support and bearing caps comprises at least one sealing lip in frictional contact with the other cap.

According to another aspect, a strut comprising a shock absorber and a suspension thrust bearing device as described above is also proposed.

BRIEF DESCRIPTION OF THE DRAWINGS

The present invention will be better understood from studying the detailed description of embodiments taken as non-limiting examples and illustrated by the appended drawings, in which.

DETAILED DESCRIPTION OF THE PREFERRED EMBODIMENTS

Figure 1:
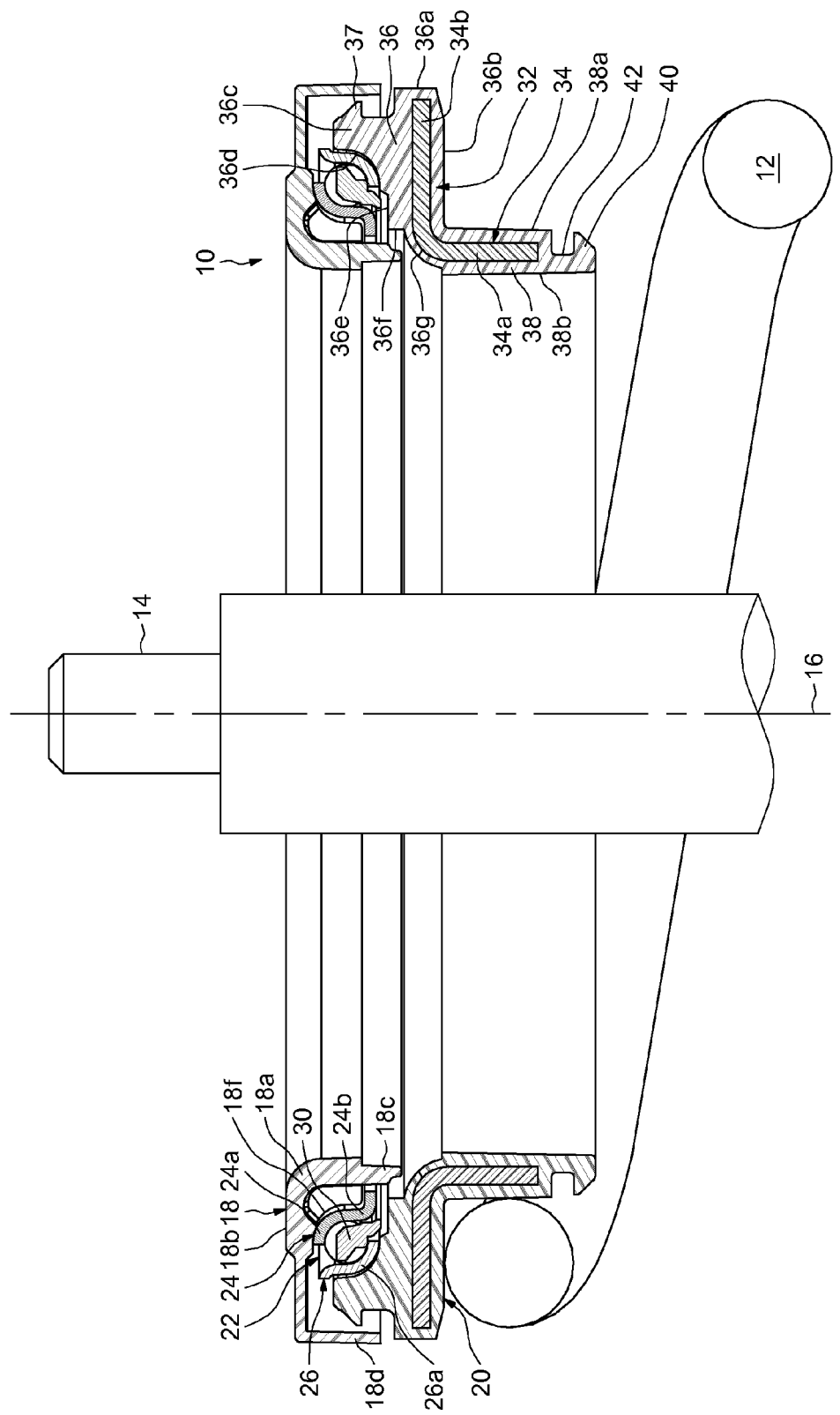
FIGS. 1 and 2 are views in axial section according to different section planes of a suspension thrust bearing device according to a first embodiment of the invention.
Figure 2:
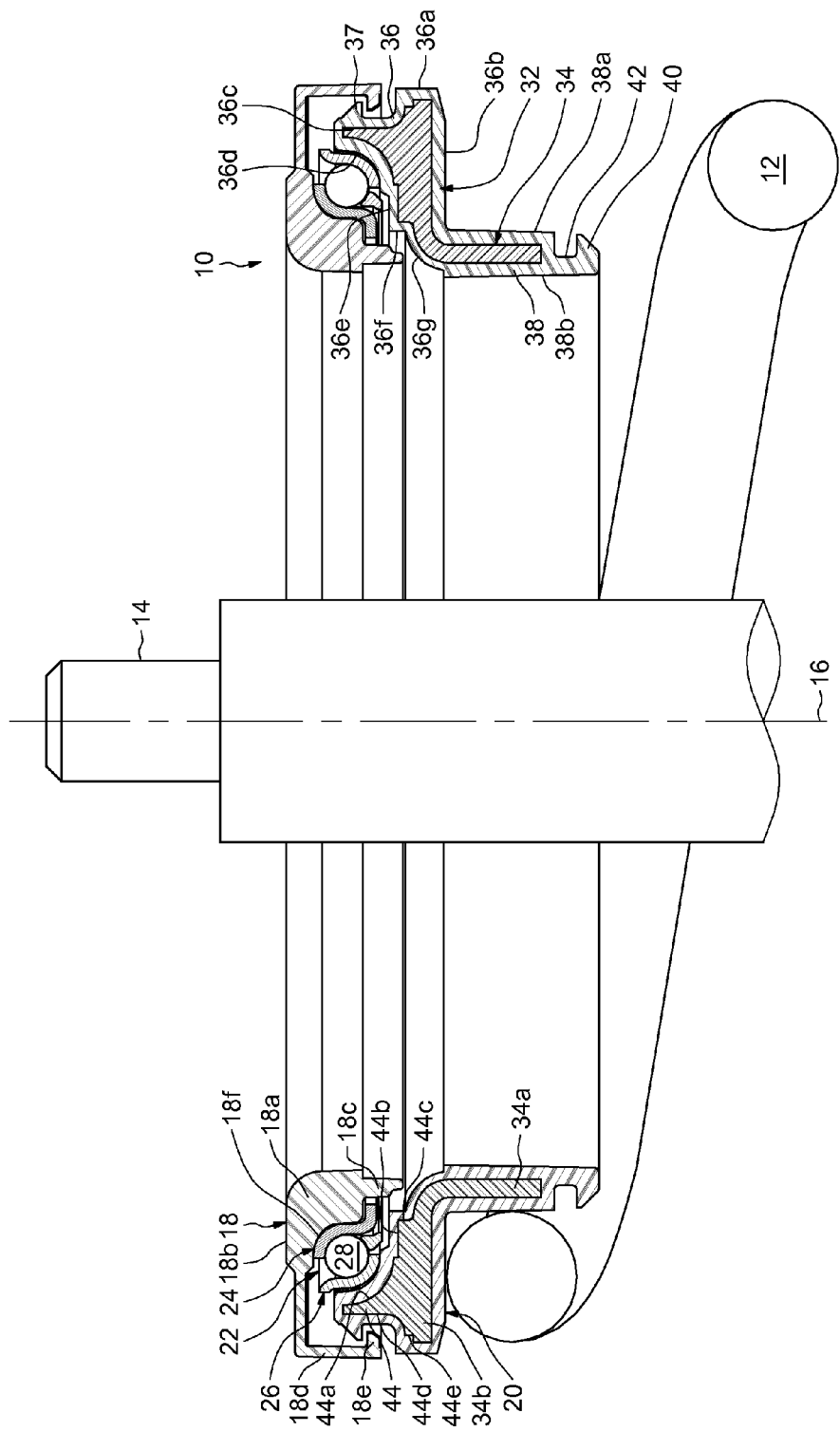

FIGS. 1 and 2 show a suspension thrust bearing device, denoted by the general reference number 10, designed to be mounted between an element of the chassis of a motor vehicle and a suspension spring 12 of helical type. The device 10 is arranged around a shock absorber rod 14, of axis 16 assumed to be vertical, the said rod being elongated axially in the form of a cylinder of revolution. The suspension spring 12 is mounted around the shock absorber rod 14.

The device 10, of axis 16, comprises an upper bearing cap 18 intended to bear against a filtering elastic block interposed between the device and the vehicle chassis, a lower support cap 20 forming a bearing means for the suspension spring 12, and a rolling bearing 22 arranged axially between the said caps and forming an axial thrust bearing.

The bearing cap 18 may consist of a one-piece body produced by moulding a synthetic material, for example a polyamide. It comprises an annular solid part 18a of which the upper radial surface 18b is intended to come into contact with the filtering elastic block. The bearing cap 18 also comprises an internal annular axial skirt 18c of small thickness arranged substantially in the continuation of the bore of the solid part 18a and extending axially downwards.

The bearing cap 18 also comprises an external annular axial skirt 18d of small thickness which is connected to the upper radial surface 18b via a radial portion inwardly extending an upper end of the said skirt. An inwardly directed hook 18e, which can be continuous or discontinuous circumferentially, is formed on the bore of the external axial skirt 18d in the vicinity of its lower end. The hook 18e is directed radially inwardly in the direction of the support cap 20.

The rolling bearing 22, of axis 16, comprises an upper ring 24 and a lower ring 26 between which is housed a row of rolling elements 28, here produced in the form of balls. A cage 30 is also provided in order to allow a regular circumferential spacing to be maintained between the rolling elements 28. The rolling elements 28 are arranged between raceways formed by the upper 24 and lower 26 rings. Advantageously, these rings can be obtained from the same blank of thin sheet by cutting and stamping, by virtue of the fact that the outside diameter of the upper ring 24 is substantially equal to the inside diameter of the lower ring 26.

The upper ring 24 has a toroidal portion 24a in contact with a complementary surface 18f of the solid part 18a of the bearing cap 18. The toroidal portion 24a is extended inwardly by a toroidal portion 24b of opposite concavity extending in the vicinity of a lower radial surface of the solid part 18a from which the internal axial skirt 18c extends. The outer surface of the toroidal portion 24a has in cross section a quarter-circle concave internal profile and forms a toric raceway for the rolling elements 28.

The lower ring 26 also comprises a toroidal portion 26a of which the inner surface has in cross section a quarter-circle concave internal profile and forms a toric raceway for the rolling elements 28. The toroidal portion 26a comes into contact against the support cap 20 and is extended outwardly by a short radial portion. The cage 30 is situated radially between the toroidal portion 24b of the upper ring 24 and the toroidal portion 26a of the lower ring 26.

The support cap 20 comprises a body 32 and an insert 34 for reinforcing the said body in order to increase the strength of the cap with respect to the loads resulting from forces exerted by the suspension spring 12.

The body 32 is made of synthetic material and comprises a part 36 in the form of a radial plate and an annular axial skirt 38 arranged inwardly and extending axially in the opposite direction to the upper bearing cap 18. The skirt 38 comprises at its lower end an outwardly directed radial bead 40 defining a groove 42 for the retention of a protective bellows (not illustrated) for the shock absorber rod 14.

The part 36 comprises a cylindrical outer surface 36a of small axial dimension from the lower end of which inwardly extends an annular frustoconical which is extended inwardly by an annular radial surface 36b delimiting a bearing surface for the upper end turn of the suspension spring 12. A small-diameter edge of the radial surface 36b is extended inwardly and downwardly by a rounded surface and then by an outer axial surface 38a of the skirt 38 which allows the spring 12 to be centred.

In the vicinity of the upper end of the axial outer surface 36a, the part 36 of the body 32 comprises an axial annular rib 36c extending in the direction of the bearing cap 18 while remaining at a distance. The outer surface of the rib 36c comprises a hook 37 directed radially outwardly in the direction of the support cap 20, which can be continuous or discontinuous circumferentially. The hook 37 has an outside diameter greater than the diameter of the hook 18e of the bearing cap 18 and is arranged axially above the latter so as to be able to interfere diametrically with the said hook in the event that the support cap 20 and the bearing cap 18 should start to separate. The hook 37 therefore forms a means for axially retaining the bearing cap 18 relative to the support cap 20 in order to prevent a detachment of the elements constituting the device 10 prior to its mounting in the vehicle strut.

The rib 36c radially surrounds the lower ring 26 of the rolling bearing 22. The upper end of the rib 36c is extended inwardly by a toroidal surface 36d in contact with the toroidal portion 26a of the lower ring 26 and of complementary shape. The toroidal surface 36d is extended inwardly by an annular frustoconical surface from which there extends inwardly an annular radial surface 36e which is extended, at a small-diameter edge, by a downwardly extending annular axial surface 36f. The lower end of the axial surface 36f is extended by a rounded surface 36g, itself extended axially downwards by an inner axial surface 38b forming the bore of the skirt 38.

The annular reinforcing insert 34 is produced in a single piece by moulding a rigid synthetic material such as a polyamide PA 6.6, a polyphthalamide PPA, a polyphenylene sulphone PPS, an acrylonitrile-butadiene-styrene ABS, etc. The synthetic material may optionally be loaded with glass or carbon fibres. The reinforcing insert 34 is here entirely embedded inside the body 32.

The reinforcing insert 34 comprises a cylindrical annular axial portion 34a which is extended, outwardly from an upper end, by a rounded portion from which there extends radially outwardly an annular radial portion 34b. The axial portion 34a extends axially inside the skirt 38. The radial portion 34b extends radially in the part 36. It is situated axially in the vicinity of the radial surface 36b and while extending radially beyond the said surface. The axial 34a and radial 34b portions have a general L shape in cross section.

The reinforcing insert 34 makes it possible to stiffen the support cap 20 and to ensure a good transmission to the rolling bearing 22 of the axial and radial loads resulting from the forces exerted by the suspension spring 12.

Figure 3:
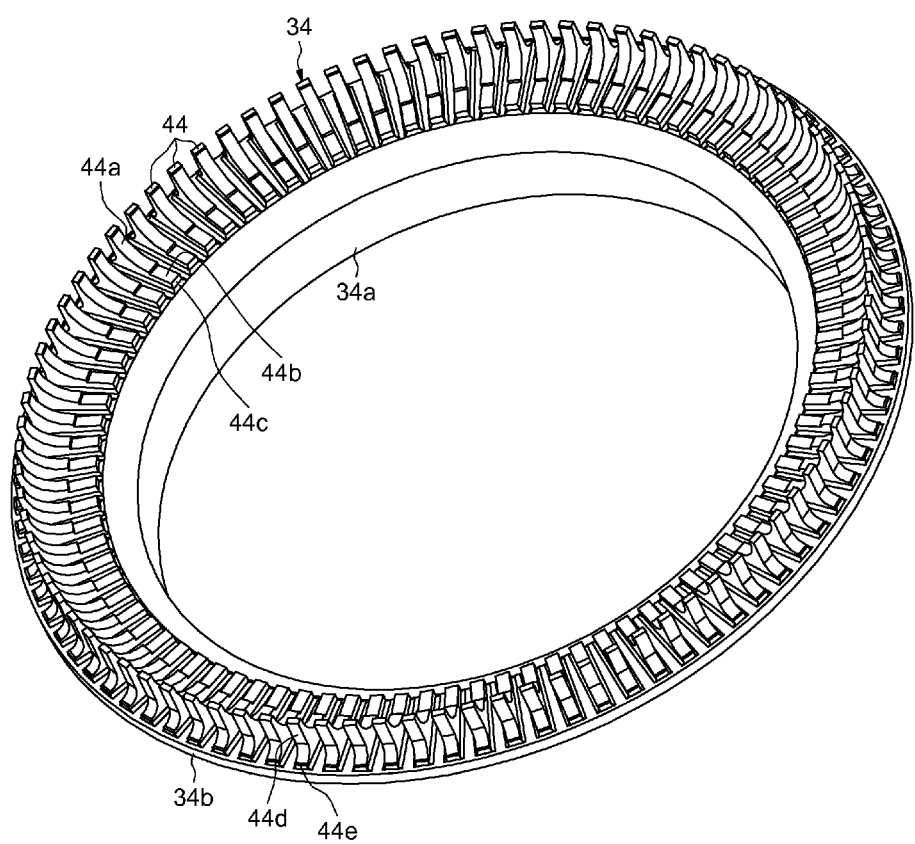
FIG. 3 is a perspective view of a reinforcing insert of the device of FIGS. 1 and 2, FIGS. 4 and 5 are views in axial section according to different section planes of a suspension thrust bearing device according to a second embodiment of the invention.

So as to increase the strength of the support cap 20 with respect to the said axial loads, the reinforcing insert 34 comprises stiffening ribs 44 (FIGS. 2 and 3) projecting axially from the radial portion 34b in the direction of the bearing cap 18. The stiffening ribs 44 are identical to one another and spaced in a regular manner in the circumferential direction. The spacing between two immediately adjacent ribs 44 is here substantially equal to the thickness taken in the circumferential direction of a rib. The ribs 44 are entirely embedded inside the part 36 of the body 32.

Each stiffening rib 44 comprises a concave surface 44a in the form of an arc of a circle whose centre coincides with the centre of the rolling elements 28. The said surface has in cross section a profile identical to that of the toroidal surface 36 of the body 32. The concave surface 44a is situated in the vicinity of the toroidal surface 36d. The lower end of the concave surface 44a is extended inwardly by a short axial surface from which there extends inwardly a radial surface 44b of which a small-diameter edge is extended axially downwards by an inner axial surface 44c which is connected to the rounded portion of the insert 34. The radial 44b and axial 44c surfaces are situated in the vicinity of the radial 36e and axial 36f surfaces of the body 32. Radially on the opposite side to the concave surface 44a, each rib 44 is delimited by an outer axial surface 44d. In other words, the upper end of the rib 44 is extended axially downwards on the outer side by the axial surface 44d. This surface is extended outwardly at its lower axial end by a rounded portion of which the large-diameter edge is extended axially downwards by a short axial surface 44e which is connected to the radial portion 34b in the vicinity of its peripheral edge.

The stiffening ribs 44 radially surround the toroidal portion 26a of the lower ring 26 and are situated axially in the vicinity of the toroidal 36d, radial 36e and axial 36f surfaces of the body 32 of the cap while being complementary in form with these surfaces. The stiffening ribs 44 extend axially between the radial portion 34b of the insert and the upper end of the lower 26 and upper 24 rings. The ribs 44 extend radially between a region axially in plumb with the toroidal portion 24b of the upper ring 24 as far as a region situated radially beyond the lower ring 26. The inner axial surface 44c forming an internal edge of the stiffening ribs 44 is offset radially towards the inside of the device with respect to the toroidal portions 26a, 24a of the lower 26 and upper 24 rings. The outer axial surface 44d forming an external edge of the ribs is offset radially outwardly with respect to the rings 24, 26 of the rolling bearing.

The production of the reinforcing insert 34 by moulding a rigid synthetic material makes it possible to be able easily to vary the thickness of the said insert so that the axial loads resulting from the forces exerted by the suspension spring 12 are taken up by the stiffening ribs 44 which locally increase the thickness of the insert. It is therefore possible to obtain relatively complex shapes for the reinforcing insert 34 in order to increase the mechanical strength of the support cap 20 with respect to the forces exerted by the suspension spring 12. The stiffening ribs 44 form means for reinforcing the mechanical strength of the support cap 20.

The body 32 may be provided in a material which is more flexible than that used for the reinforcing insert 34, for example an unfilled polyamide PA or an elastomeric material such as a polyurethane PU, a nitrile rubber NBR, a hydrogenated nitrile rubber HNBR, etc.

The support cap 20 comprises the body 32 made of flexible material and the reinforcing insert 34 of rigid material defining the ribs 44 in order to provide sufficient stiffness to the cap and a good transmission of the forces between the suspension spring 12 and the rolling bearing 22. The shape and the thickness of the ribs 44 are chosen for this purpose. Moreover, the circumferential space separating two successive ribs 44 promotes the attachment of the flexible material of the body 32 during its overmoulding on the rigid reinforcing insert 34. In a variant embodiment, it could be possible to provide the reinforcing insert 34 devoid of the axial portion 34a.

Figure 4:
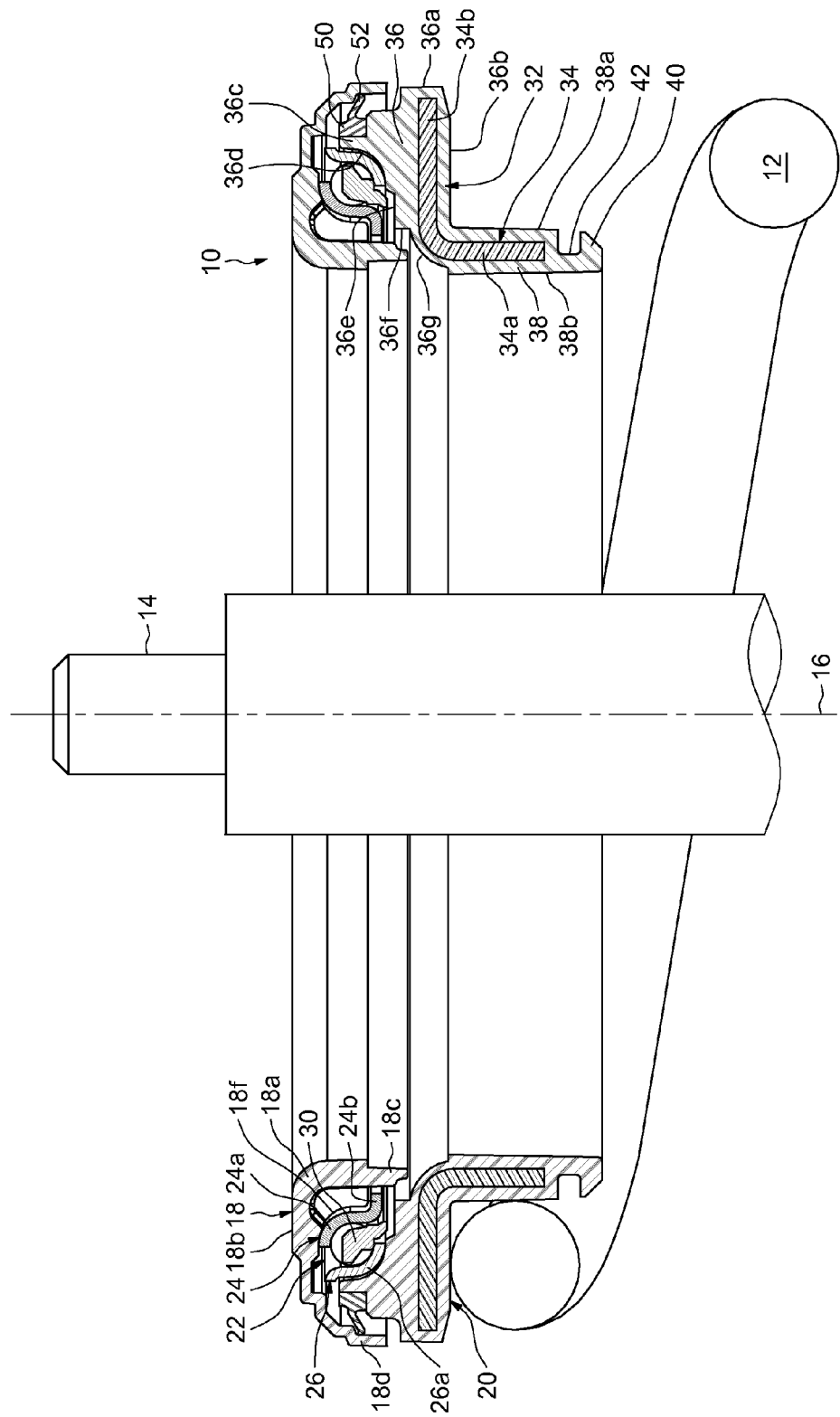
Figure 5:
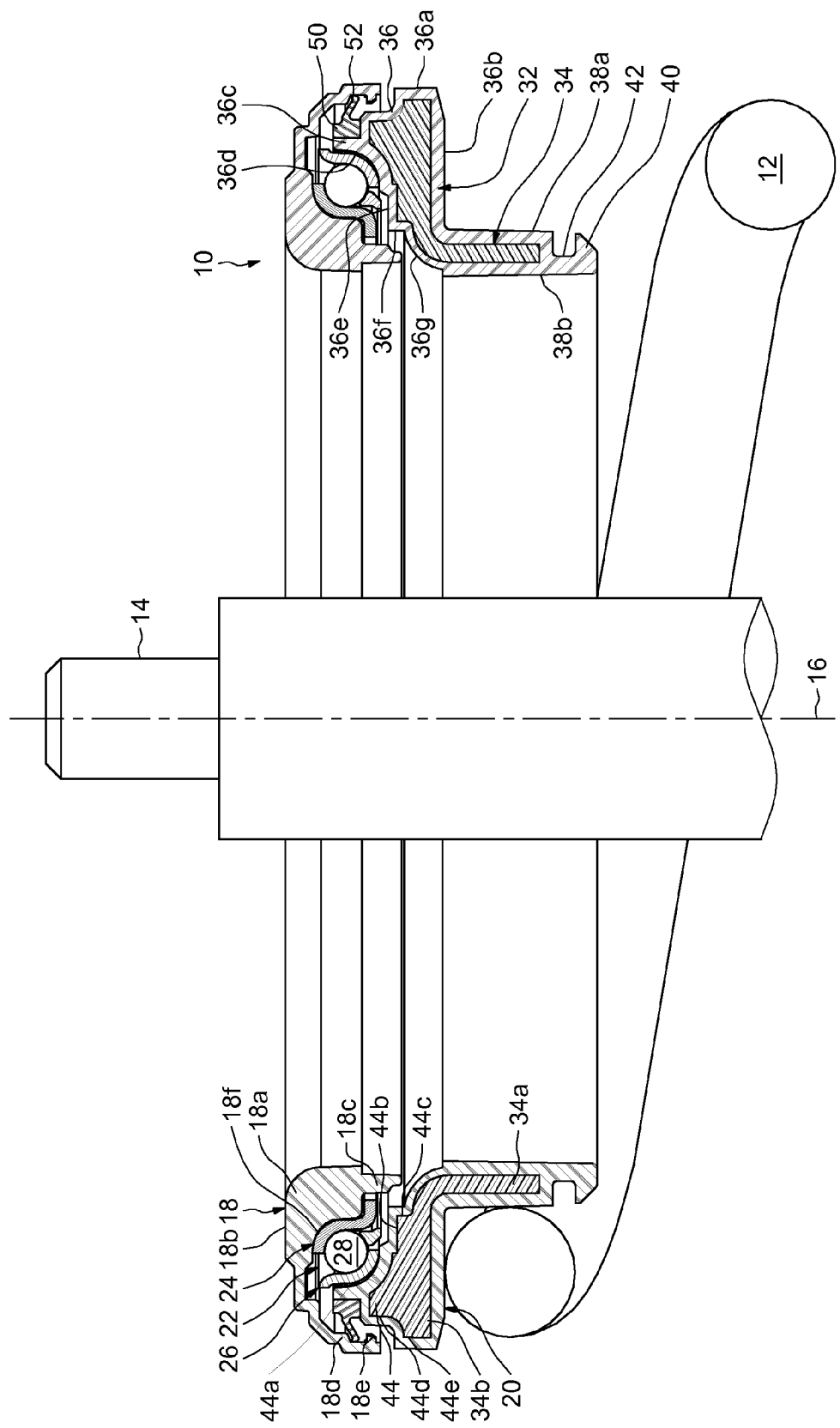
Figure 6:
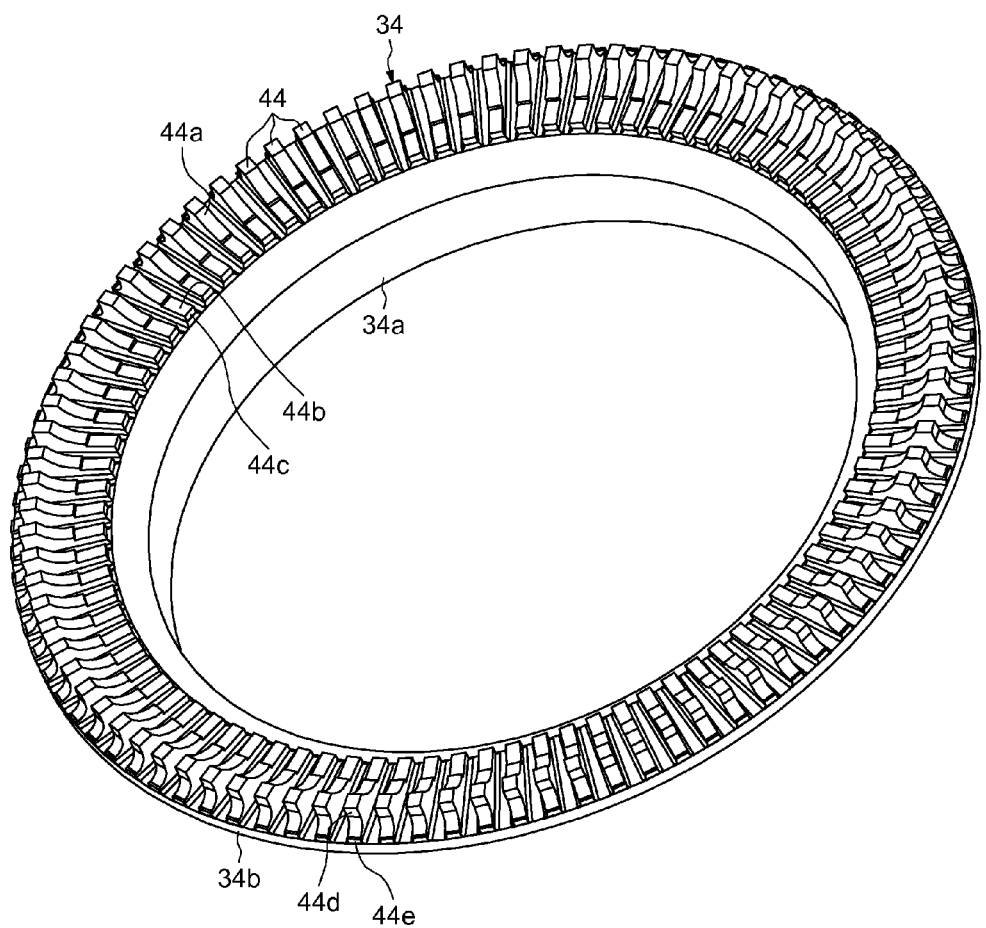
FIG. 6 is a perspective view of a reinforcing insert of the device of FIGS. 4 and 5.

The embodiment illustrated in FIGS. 4 to 6, in which similar elements bear the same references, differs mainly in that the support cap 20 comprises a seal 50 overmoulded onto the rib 36c of the body 32, the said rib here having a stepped outer surface. In this embodiment, given the stepped shape of the rib 36c of the body 32, the axial dimensions of the concave 44a and axial 44d surfaces of the ribs are reduced. The axial surface 44e of each rib 44 is here connected to the peripheral edge of the radial portion 34b of the insert 34.

The seal 50 is overmoulded onto the stepped outer surface of the rib 36 and is provided with a relatively thin annular lip 52 projecting radially outwards and coming into frictional contact against the bore of the external axial skirt 18d of the bearing cap 18. The lip 52 is slightly curved downwards.

The sealing lip 52 makes it possible to avoid the intrusion of polluting particles between the external axial skirt 18d of the bearing cap 18 and the outer surface of the support cap 20. The downward curvature of the sealing lip 52 is particularly advantageous insofar as that increases its amplitude to repel any splashes of water or polluting particles. The lip 52 thus forms a particularly effective deflector. Furthermore, during such splashes, the contact pressure between the lip 52 and the bearing cap 18 increases, thereby increasing its efficiency.

Moreover, the sealing lip 52 also has a function of axially retaining the bearing cap 18 prior to the mounting of the device 10 between the vehicle chassis and the suspension spring 12. Specifically, the lip 52 has an outside diameter greater than the inside diameter of the hook 18e of the bearing cap 18 and is arranged axially above the latter so as to be able to interfere diametrically with the said hook in the event that the support cap 20 and the bearing cap 18 should start to separate. The sealing lip 52 therefore also forms a means for axially retaining the cap 18 relative to the cap 20. The downward orientation of the sealing lip 52 facilitates its deformation during the mounting of the parts while ensuring a sufficient axial retention to manipulate and transport the assembly thus constituted without risk of accidental demounting.

In a variant, it could be possible to additionally provide an internal seal at the axial surface 36f of the body 32 comprising a sealing lip coming into frictional contact with the outer surface of the internal axial skirt 18c of the bearing cap 18. In another variant, it could also be possible to provide an internal seal and/or an external seal overmoulded onto the bearing cap 18 and comprising a lip bearing frictionally against the support cap 20.

Figure 7:
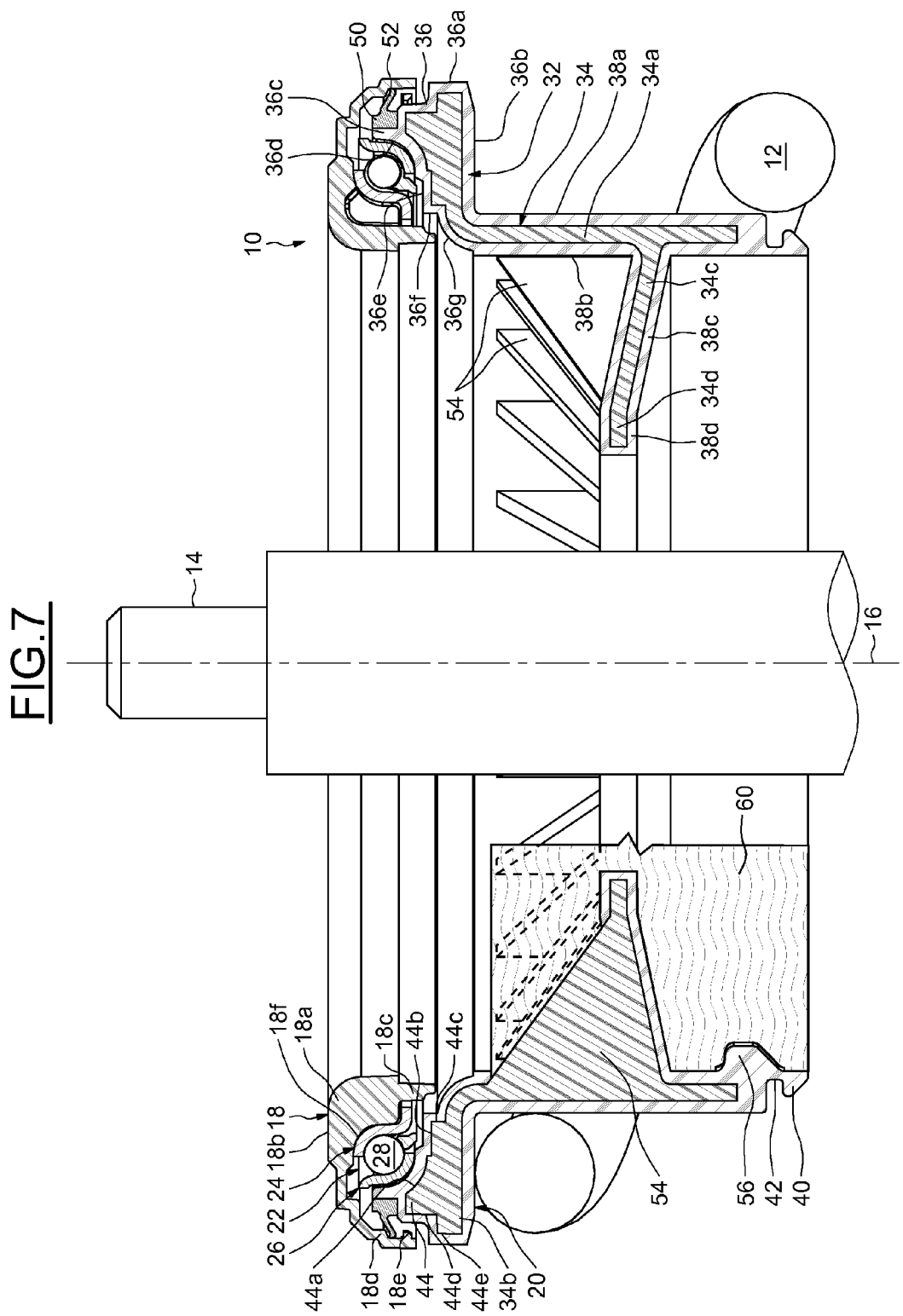
FIG. 7 is a view in axial section of a suspension thrust bearing device according to a third embodiment of the invention.
Figure 8:
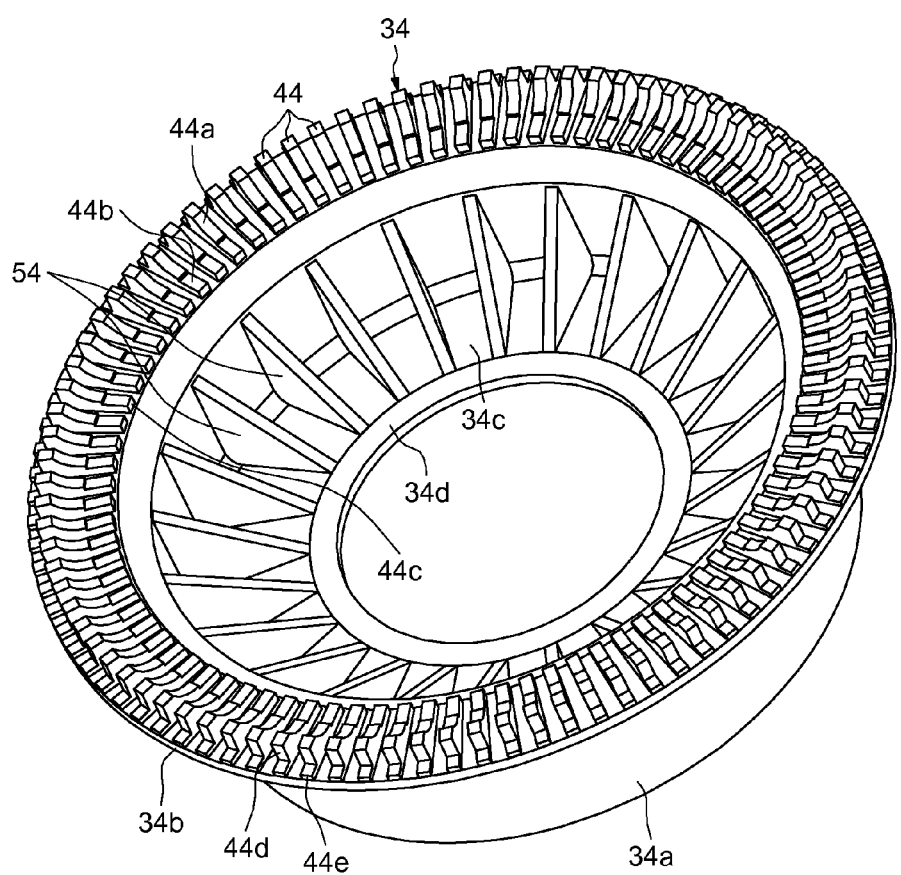
FIG. 8 is a perspective view of a reinforcing insert of the device of FIG. 7, FIGS. 9 and 10 are views in axial section according to different section planes of a suspension thrust bearing device according to a fourth embodiment of the invention.

The embodiment illustrated in FIGS. 7 and 8, in which identical elements bear the same references, differs mainly from the embodiment previously described in that additional stiffening ribs 54 extend radially inwards from the bore of the axial portion 34a of the reinforcing insert so as to be able to take up the forces exerted by a shock-absorbing pad 70 (partially shown in FIG. 7 enabling clarity for other components), as will be described in more detail hereinafter. The shock-absorbing pad 70 is generally made of flexible material such as a rubber or the like.

The axial portion 34a of the reinforcing insert and the skirt 38 of the support cap 20 here have an axial dimension which is greater than that of the preceding embodiment. The reinforcing insert 34 here additionally comprises a substantially radial annular collar 34c extending inwardly from the bore of the axial portion 34a. The small-diameter edge of the collar 34c is situated axially substantially at the mid-height of the axial portion 34a and is extended radially inwardly by an annular radial rim 34d. The rim 34d delimits a bore for allowing the passage of the shock absorber rod 14. The ribs 54 have a triangular shape in cross section. They are identical to one another and spaced in a regular manner in the circumferential direction. The spacing between two immediately adjacent ribs 54 is greater than the spacing provided between the ribs 44. The ribs 54 extend radially inwards from the bore of the axial portion 34a and are connected to the collar 34c. In other words, the ribs 54 extend from the collar 34c axially upwards in the direction of the rolling bearing 22. The upper edge of the ribs 54 is situated axially in the vicinity of the rounded portion connecting the axial 34a and radial 34b portions of the insert. The ribs 54 are oriented in such a way that their thickness in an axial direction decreases from the axial portion 34a.

The bore 38b of the axial skirt 38 of the support cap is extended radially inwardly by a substantially radial annular collar 38c, itself extended radially inwardly by an annular radial rim 38d, inside which collar and rim are respectively embedded the collar 34c and the rim 34d of the reinforcing insert 34. The bore 38b of the skirt 38 likewise comprises retaining beads or hooks 56 in its lower part which project radially inwardly and which are axially distant from the collar 38c. These hooks 56 are intended to cooperate with an annular rib of the shock-absorbing pad 70. The cooperation between the rib of the shock-absorbing pad 70 and the hooks 56 makes it possible to axially maintain the shock-absorbing pad 70 with respect to the device 10. The upper end of the shock-absorbing pad 70 is housed in the bore 38b of the skirt 38 of the support cap 20, an axial space being able to remain between this upper end and the collar 38c.

The collar 34c and the stiffening ribs 54 make it possible to take up the axial forces which can be exerted by the shock-absorbing pad 70 on the collar 38c of the support cap 20 during compression impacts caused by extreme deflections of the suspension. Specifically, during such deflections, the shock-absorbing pad 70 is compressed axially against the collar 38c of the support cap 20, which also causes its radial compression or extension towards the outside in the direction of the bore 38b of the skirt 38. That part of the axial portion 34a of the reinforcing insert 34 arranged axially below the collar 34c for its part makes it possible to take up the radial forces generated by the compression of the shock-absorbing pad 70. Furthermore, during this compression, the skirt 38 reinforced by this part of the axial portion 34a radially confines the shock-absorbing pad 70, thereby making it possible to increase the axial stiffness of the said pad 70 after the start of its compression.

Figure 9:
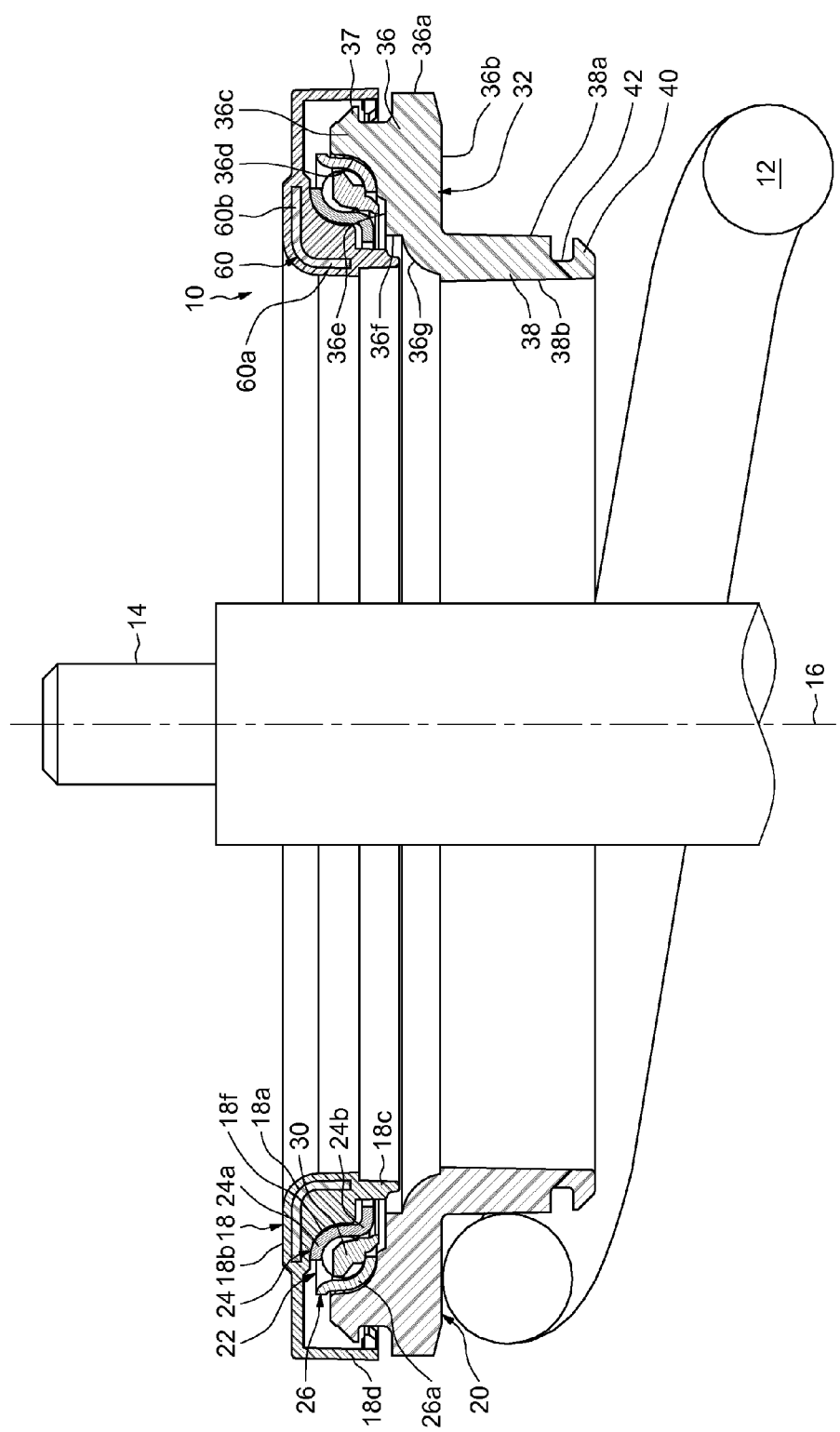
Figure 10:
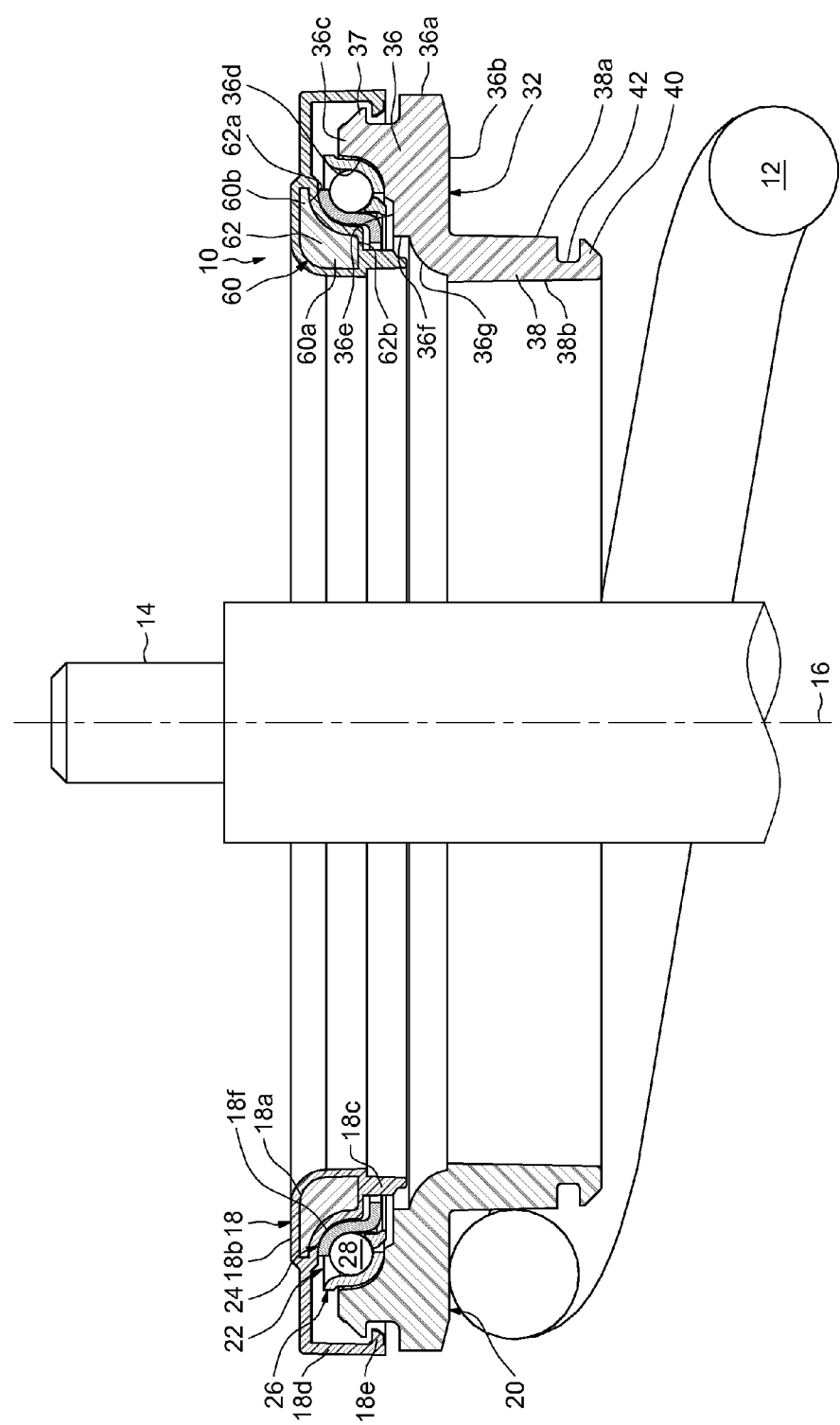
Figure 11:
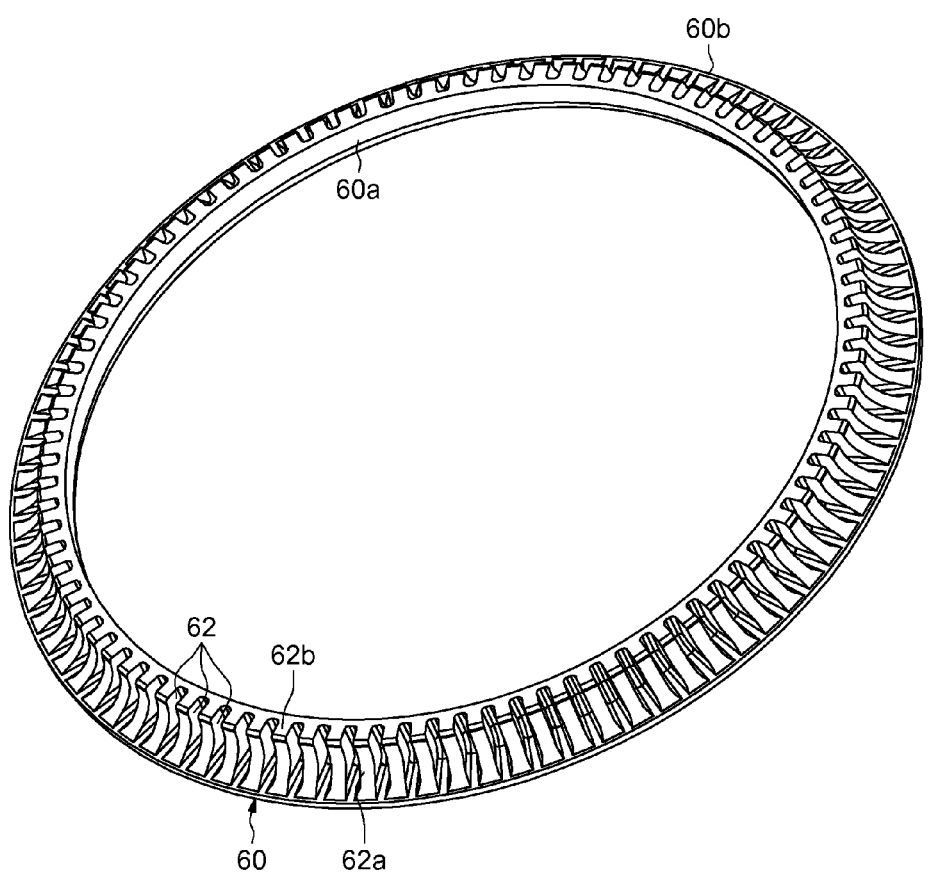
FIG. 11 is a perspective view of a reinforcing insert of the device of FIGS. 9 and 10.
Figure 12:
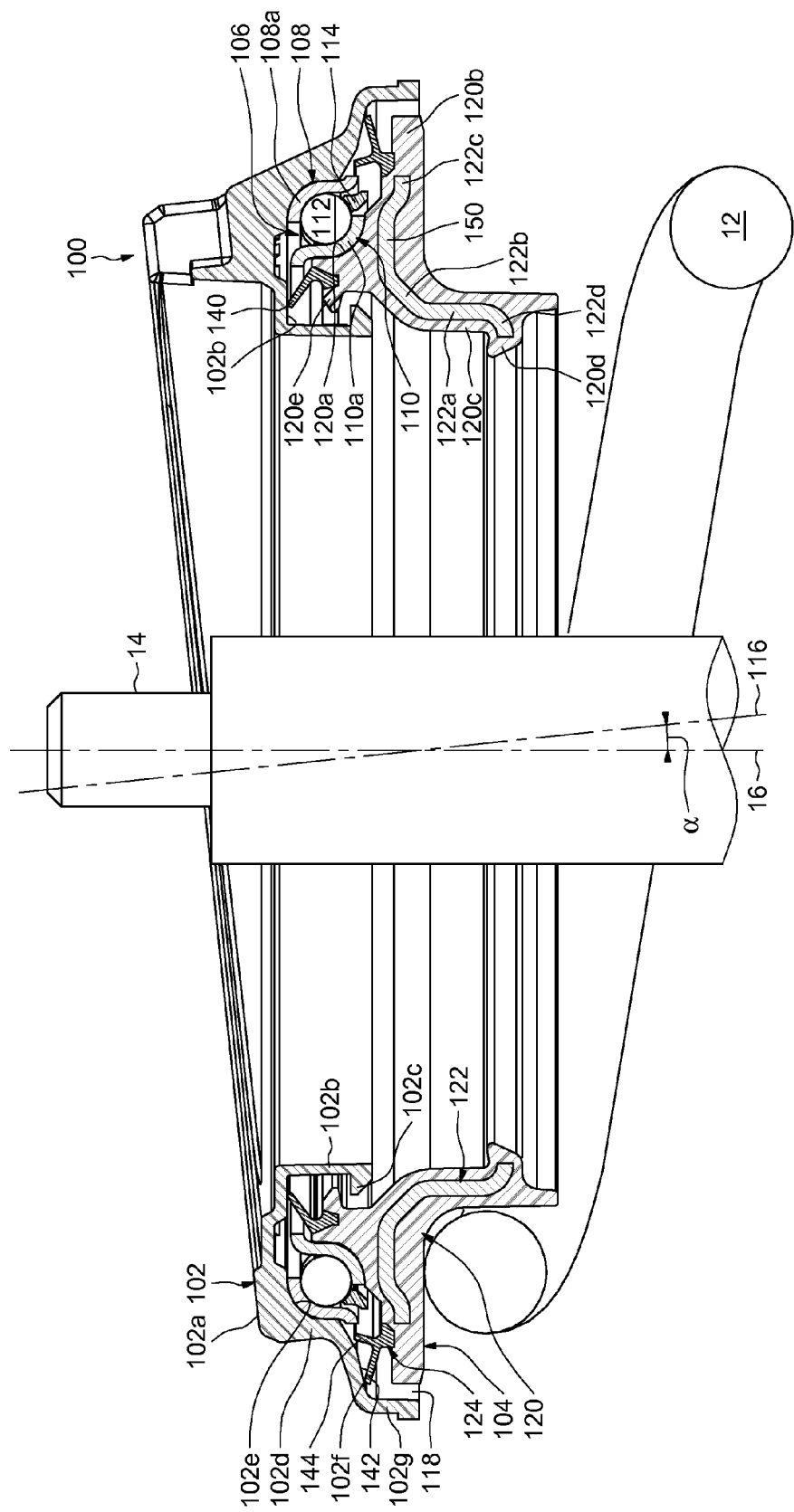
FIG. 12 is a view in axial section of a suspension thrust bearing device according to a fifth embodiment of the invention.
Figure 13:
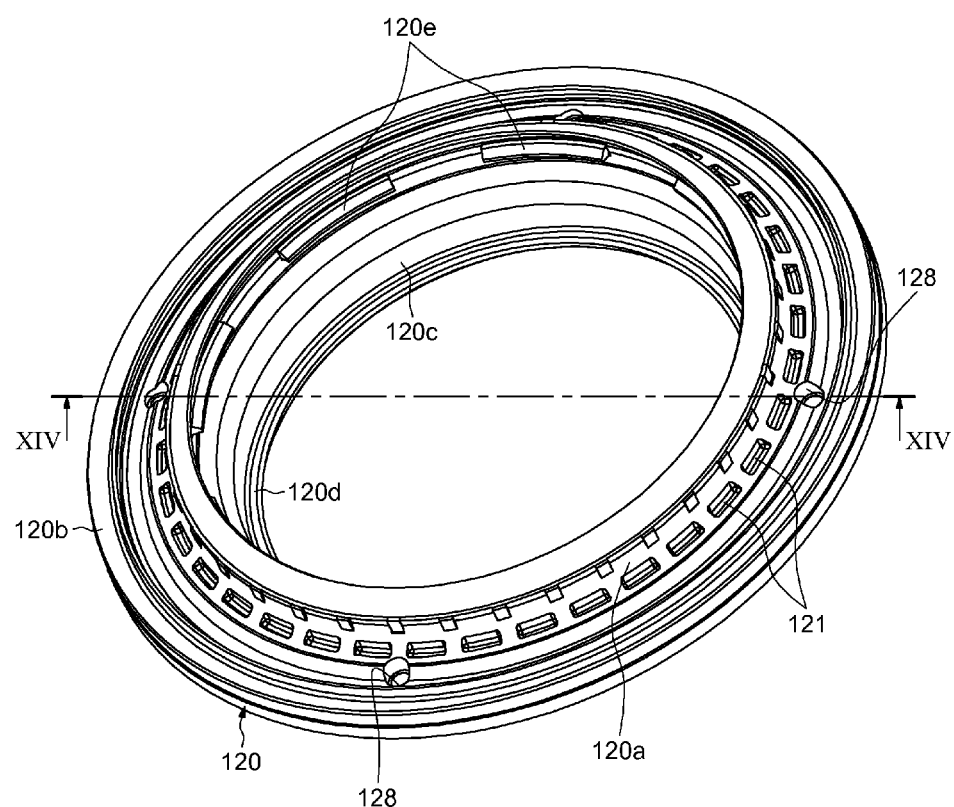
FIG. 13 is a partial perspective view of a lower support cap of the device of FIG. 12.
Figure 14:
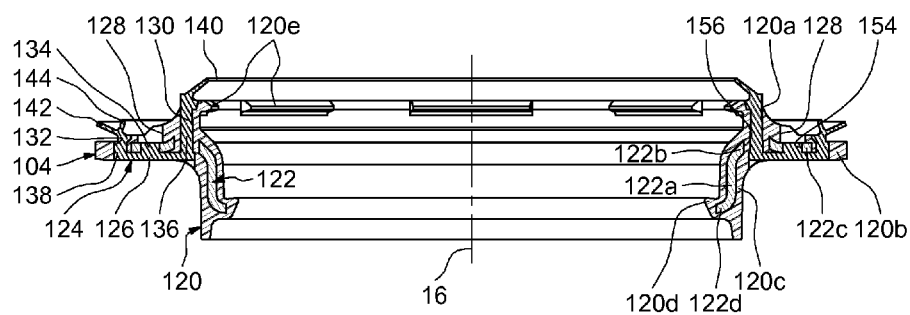
FIG. 14 is a view in section of the support cap taken on the axis XIV-XIV of FIG. 13.
Figure 15:
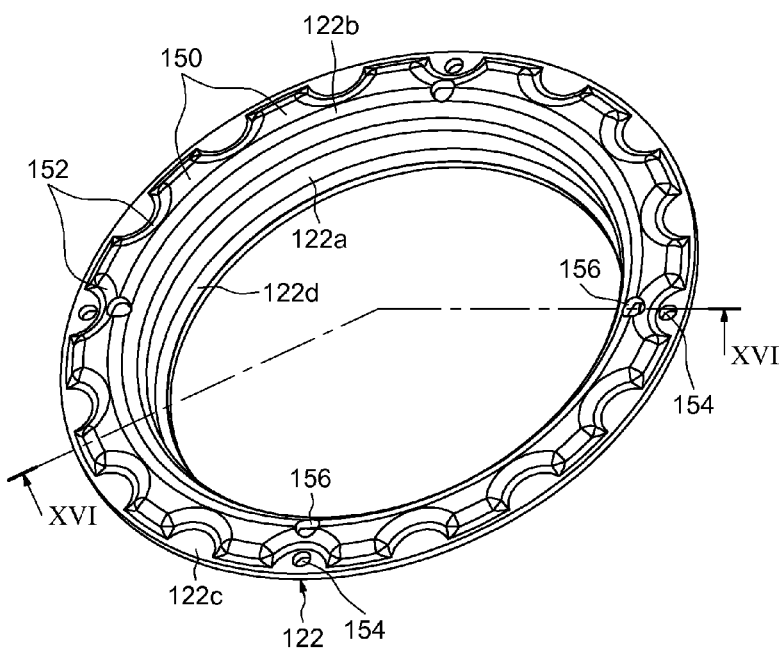
FIG. 15 is a perspective view of a reinforcing insert of the support cap of FIGS. 13 and 14.
Figure 16:
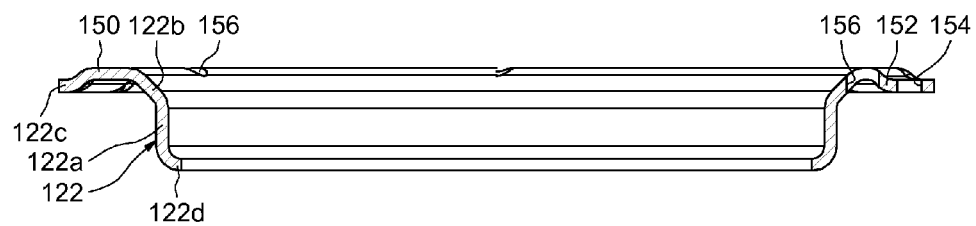
FIG. 16 is a view in section taken on the axis XVI-XVI of FIG. 15.

In the preceding embodiments, the support cap 20 comprises a reinforcing insert 34 in order to increase its mechanical strength with respect to the forces exerted by the suspension spring 12 and, where appropriate, by the shock-absorbing pad. Alternatively, it is possible to provide a thrust bearing device 10 comprising a reinforcing insert associated with the upper bearing cap 18, as illustrated in FIGS. 9 to 11 representing a fourth embodiment in which similar elements with respect to the first embodiment described bear the same references.

The bearing cap 18 comprises an annular reinforcing insert 60 produced in a single piece by moulding a rigid synthetic material such as a polyamide PA 6.6, a polyphthalamide PPA, a polyphenylene sulphone PPS, an acrylonitrile-butadiene-styrene ABS, etc. The synthetic material can optionally be loaded with glass or carbon fibres. The reinforcing insert 60 is here entirely embedded inside the body of the bearing cap 18. It comprises an axial portion 60a which is extended, outwardly from an upper end, by a rounded portion from which there extends radially outwardly a radial portion 60b. The axial 60a and radial 60b portions have a general L shape in cross section. The axial 60a and radial 60b portions extend respectively axially and radially in the solid part 18a of the body of the bearing cap 18. The axial portion 60a is situated axially in the continuation of the internal axial skirt 18c. The radial portion 60b is situated axially between the upper radial surface 18b of the bearing cap 18 and the toroidal surface 18f of the said cap. The body of the bearing cap 18 is overmoulded onto the reinforcing insert 60.

The reinforcing insert 60 makes it possible to stiffen the bearing cap 18 and provide a good transmission to the chassis of the axial and radial loads resulting from the forces exerted by the suspension spring 12 and transmitted by the angular-contact rolling bearing 22.

In this regard, the reinforcing insert 60 comprises stiffening ribs 62 projecting axially from the radial portion 60b in the direction of the upper ring 24 of the rolling bearing 22 while being connected on the inner side to the axial portion 60a. The stiffening ribs 62 are identical to one another and spaced in a regular manner in the circumferential direction. The spacing between two immediately adjacent ribs 62 is here substantially equal to the thickness taken in the circumferential direction of a rib. The stiffening ribs 62 are entirely embedded inside the solid part 18a of the body of the bearing cap 18.

Each stiffening rib 62 comprises a concave surface 62a complementary in shape with the toroidal surface 18f of the solid portion 18a of the bearing cap 18 and situated in the vicinity of the said surface. The upper end of the concave surface 62a is connected to the large-diameter end of the radial portion 60b. The lower end of the concave surface 62a is extended radially inwardly by a radial surface 62b which is connected to the lower end of the radial portion 60a.

The stiffening ribs 62 extend axially between the toroidal portion 24b of the upper ring 24 and the upper radial surface 18b of the bearing cap 18, and radially between the bore of the solid part 18a and the toroidal portion 26a of the lower ring 26. The radial surface 62b forming an internal edge of the stiffening ribs 62 is offset radially towards the inside of the device with respect to the toroidal portion 24a of the upper ring 24. The upper end of the concave surface 62a forming an external edge of the ribs is slightly offset towards the outside with respect to the upper ring 24.

In the previously described embodiments, the suspension thrust bearing devices comprise a cap of which the mechanical strength is reinforced by the presence of a reinforcing insert made of synthetic material. It is also possible to provide a reinforcing insert of metal material as will be described in the embodiments of FIGS. 12 to 21.

FIGS. 12 to 16 show a suspension thrust bearing device 100, according to a fifth embodiment, which comprises an upper bearing cap 102, a lower support cap 104 forming a bearing means for the suspension spring 12, and a rolling bearing 106 enclosed axially between the said caps.

The rolling bearing 106 comprises an upper ring 108 in contact with the bearing cap 102, a lower ring 110 in contact with the support cap 104, and a plurality of rolling elements 112, here produced in the form of a row of balls. A cage 114 is also provided in order to allow a regular circumferential spacing to be maintained between the rolling elements 112. The rolling elements 112 are arranged between raceways formed by the upper 108 and lower 110 rings.

The upper ring 108 comprises a toroidal portion 108a in contact with a complementary surface of the bearing cap 102. The inner surface of the toroidal portion 108a has in cross section a quarter-circle concave internal profile and forms a toric raceway for the rolling elements 112. The lower ring 110 also comprises a toroidal portion 110a of which the outer surface has in cross section a quarter-circle concave internal profile and forms a toric raceway for the rolling elements 112. The toroidal portion 110a comes into contact against a complementary surface of the support cap 104 and is extended in the direction of the bearing cap 102.

The bearing cap 102 may consist of a one-piece body produced by moulding a synthetic material, for example a polyamide. It comprises an upper surface 102a which, in the example illustrated, is oriented orthogonally with respect to an axis 116 forming an angle a with the axis 16 of the device. The axis 116 constitutes the axis of bearing on the vehicle body directly or indirectly in contact with the upper surface 102a of the bearing cap. The angle a formed between the axes 16 and 116 makes it possible to reduce the radial forces exerted by the suspension spring 12 on the support cap 104 while maintaining a good distribution of the axial forces exerted by the latter. The angle a may be between 3 and 45°, preferably between 5 and 20°.

The bearing cap 102, of axis 16, also comprises an internal annular axial skirt 102b of smaller thickness than the rest of the cap and having on its lower peripheral edge a plurality of hooks 102c distributed over its circumference and directed outwardly, that is to say towards the rolling bearing 106. The hooks 102c which form outwardly directed radial protuberances may in a variant be replaced by a continuous rib made circumferentially on the edge of the axial skirt 102b. The bearing cap 102 also comprises a support portion 102d which has, on the inner side, a surface 102e complementary with the toroidal portion 108a of the upper ring 108 of the rolling bearing. The lower end of the toroidal surface 102e is extended outwardly by a surface 102f of substantially frusto-conical shape continued by an external annular axial skirt 102g directed towards the lower support cap 104 while leaving remaining with respect to the latter a small-dimension annular space 118 capable of limiting the penetration of polluting particles such as dust inside the device and the rolling bearing.

The support cap 104, of axis 16, comprises a body 120 made of rigid synthetic material, an insert 122 for reinforcing the said body in order to increase the strength of the cap with respect to the loads resulting from the forces exerted by the suspension spring 12, and a flexible part 124 fulfilling a sealing function.

The body 120 may for example be made of polyamide PA 6.6 optionally loaded with glass or carbon fibres. The body 120 has a bearing surface 120a for the toroidal portion 110a of the lower ring 110 which is wholly complementary with the said portion. The bearing surface 120a comprises a plurality of bosses 121 (FIG. 13) distributed in a regular manner on its circumference in order to provide a good centring of the lower ring 110. The body 120 also comprises a part 120b in the form of a radial plate and a cylindrical annular axial skirt 120c arranged inwardly and extending axially in the opposite direction to the upper bearing cap 102. The annular lower radial surface of the part 120b delimits a bearing surface for the upper end turn of the suspension spring 12. An outer axial surface of the skirt 120c allows the spring 12 to be centred. The bore of the skirt 120c comprises in its lower part an annular retention bead 120d which extends radially inwardly and is intended to cooperate with a rib provided in a projecting manner on a shock-absorbing pad (not shown). The cooperation of the rib of the shock-absorbing pad with the annular retention bead 120d makes it possible to axially maintain the said pad with respect to the device 100.

The body 120 also comprises, on the radially internal side with respect to the rolling bearing 106, a plurality of hooks 120e directed radially inwardly in the direction of the bearing cap 102. In a variant, these hooks could be replaced by a continuous rib made circumferentially on the body 120. The hooks 120e have an inside diameter which is less than the diameter of the hooks 102c of the bearing cap 102 and are arranged axially above these so as to be able to interfere diametrically with the said hooks in the event that the support cap 104 and the bearing cap 102 should start to separate. The hooks 120e therefore form a means for axially retaining the bearing cap 102 relative to the support cap 104 in order to avoid a detachment of the elements constituting the device 100 prior to its mounting in the vehicle strut.

The flexible part 124 may consist of an elastomeric material, for example a synthetic rubber such as polyurethane. This material is overmoulded onto the reinforcing insert 122 while forming radial connection beads 126 terminating at the lower radial surface of the part 120b delimiting the bearing surface for the suspension spring 12. The overmoulding of the flexible part 124 is performed by virtue of the existence of cylindrical axial channels 128 to 132 left free in the body 120 and of through orifices in the reinforcing insert 122, as will be described in more detail hereinafter.

The channels 128 extend axially in the thickness of the body 120 from the bearing surface 120a. They here number four and are arranged at 90° with respect to one another. During the overmoulding of the rigid synthetic material of the body 120 onto the reinforcing insert 122, the internal 130 and external 132 channels are also formed in the said body in such a way that an internal channel 130 is situated in the same radial plane as an external channel 132 and as an intermediate channel 128. The flexible part 124 can be overmoulded with a reduced number of points of injection through the channels 128, the flexible material then being distributed in the manufacturing mould by virtue of the channels 130 and 132. The moulding of the flexible part 124 thereby forms intermediate studs 134 connected to the beads 126, and internal 136 and external 138 studs extending from the said beads through the body 120 as far as the upper surface thereof.

The flexible part 124 comprises, on the radially internal side with respect to the rolling bearing 106, a sealing lip 140 taking the form of an annular protrusion connecting the upper edges of the internal studs 136 of the flexible part 124. The sealing lip 140 extends obliquely inwards and comes into contact with a planar annular radial surface 102h of the bearing cap 102, the small-diameter edge of the said surface being extended axially by the skirt 102b.

On the outer side with respect to the rolling bearing 106, the flexible part 124 additionally comprises, in the illustrated example, a sealing lip 142 taking the form of an annular protrusion connecting the upper edges of the external studs 138 of the flexible part 124. The sealing lip 142 extends obliquely outwards and comes into frictional contact with the frustoconical surface 102f of the bearing cap 102. Also extending from the sealing lip 134 is an additional sealing lip 144 extending obliquely inwards in the direction of the frustoconical surface 102f while remaining, however, at a distance therefrom. The sealing of the outer side of the device 100 is thus ensured by the combination of a labyrinth seal formed by the narrow space or passage 118 and by the frictional 142 and labyrinth 144 sealing lips.

The reinforcing insert 122 is advantageously produced in a single piece from a blank of thin sheet by cutting and stamping. The reinforcing insert 122 comprises a cylindrical annular axial portion 122a which is extended from an upper end, axially upwards and radially outwards, by an annular frustoconical portion 122b and an annular radial portion 122c. Between the radial portion 122c and the frustoconical portion 122b are formed radial ribs 150 extending axially in the direction of the lower ring 110 of the rolling bearing. The ribs 150 are obtained by local deformations of the radial portion 122c so as to project axially upwards with respect to the said radial portion. The ribs 150 extend axially in the direction of the rolling bearing 106 from the radial portion 122c. The ribs 150 are identical to one another and spaced in a regular manner in the circumferential direction. The spacing between two immediately adjacent ribs 150 is here substantially equal to the thickness taken in the circumferential direction of a rib. The radial internal edge of each rib 150 is connected to the upper end of the frustoconical portion 122b, the radial external edge being connected to the radial portion 122c by a rounded portion of concave shape.

The circumferential edge of each rib 150 is connected to the circumferential edge of the immediately adjacent rib by a concave connection portion 152 extending radially inwards and having in plan view a general C shape directed outwardly. In cross section, the connection portion 152 extends substantially obliquely, an internal radial edge of the said portion being connected to the upper edge of the frustoconical portion 122b and an external radial edge connecting to the radial portion 122c. The stiffening ribs 150 and the connection portions 152 are obtained by deformations of the radial portion 122c. On the circumference of the radial portion 122c, an alternating arrangement of axial projections formed by the ribs 150 and of recesses constituted by the connection portions 152 are thus formed. In other words, at the radial portion 122c, the reinforcing insert 122 thus comprises an alternating arrangement of corrugations or waves and of recesses in the circumferential direction.

The ribs 150 make it possible to increase the mechanical strength of the support cap 104 with respect to the axial loads resulting from the forces exerted by the suspension spring 12. The reinforcing insert 122 is entirely embedded inside the body 120. It is arranged in the body 120 in such a way that the ribs 150 are axially arranged between the region of the lower surface of the part 120b against which the suspension spring 12 bears and the toroidal portion 110a of the lower ring 110 of the rolling bearing. The internal radial edge of the ribs 150 is offset radially towards the inside of the device with respect to the lower ring 110, the external radial edge of the ribs being offset radially outwards with respect to the said ring. The axial portion 122a extends axially inside the skirt 120c of the support cap 104. Alternatively, as a replacement for the plurality of ribs 150, it could be possible to provide an annular rib formed from the radial portion 122c. However, the recessed connection portions 152 separating the stiffening ribs 150 make it possible to increase the mechanical strength of the insert.

The reinforcing insert 122 further comprises an annular rim 122d extending radially inwards from the lower end of the axial portion 122a. This rim 122d makes it possible to further increase the stiffness of the reinforcing insert 122. The rim 122d extends in part inside the retention bead 120d of the body 120 of the support cap.

In order to allow the overmoulding of the rigid synthetic material of the body 120 and of the flexible part 124, the reinforcing insert 122 comprises a first and a second series of cylindrical through orifices 154, 156 formed respectively on the radial portion 122c and at the region of connection between the frustoconical portion 122b and the connection portions 152. The orifices 154, 156 here number four and are distributed in a regular manner in the circumferential direction. The orifices 156 have a diameter greater than that of the orifices 154 and are arranged in such a way that each orifice 154 is aligned radially with an orifice 156. Each orifice 156 is therefore arranged in the same radial plane as one of the orifices 154. The orifices 154, 156 of the reinforcing insert 122 form passages of a dual function, namely allowing the transfer and the circulation of the rigid synthetic material of the body 120 and of the flexible part 124 between two opposed surfaces of the insert, and additionally providing an efficient attachment of these two materials to the said insert. The orifices 154 are coaxial to the channels 128 of the body 120 and their bore is covered by the studs 134. The orifices 156 are coaxial to the internal channels 130 and their bore is covered by the synthetic material of the body 120.

The overmoulding of the two different materials of the support cap 104 is therefore performed in two successive steps which can be carried out by different techniques, for example by simple overmoulding or else by two-shot injection moulding. In a variant, it is conceivable that it could also be possible to provide a support cap 104 devoid of the flexible part 124.

Figure 17:
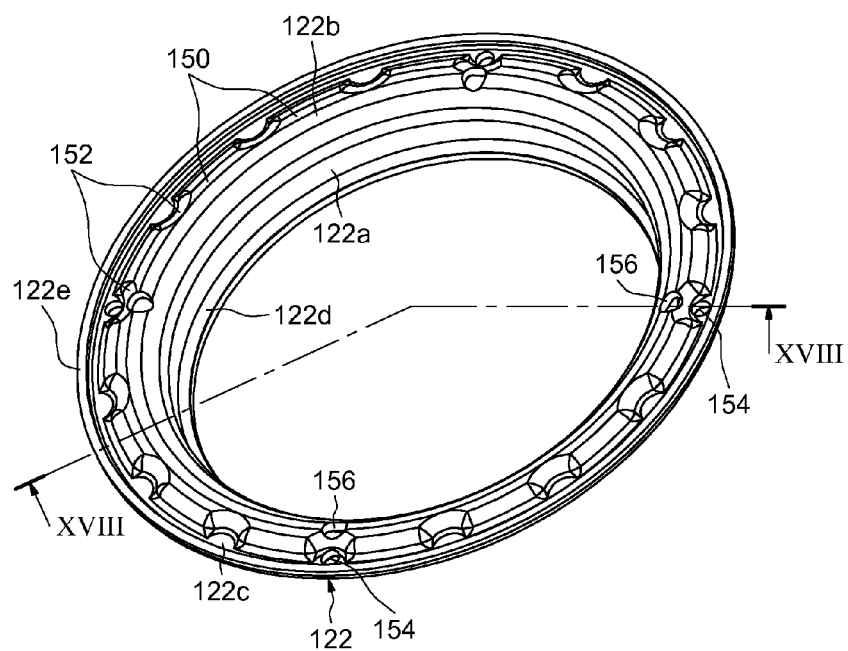
FIG. 17 is a perspective view of a reinforcing insert of the lower support cap of a suspension thrust bearing device according to a sixth embodiment of the invention.
Figure 18:
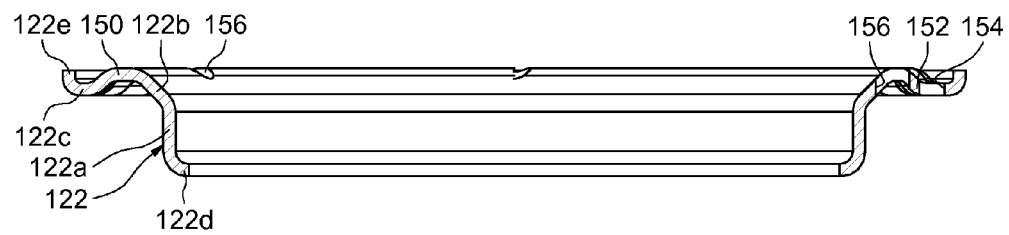
FIG. 18 is a view in section taken on the axis XIII-XIII of FIG. 17.

The variant embodiment illustrated in FIGS. 17 and 18, in which identical elements bear the same references, differs from the previously described embodiment in that the reinforcing insert 122 additionally comprises an annular peripheral rim 122e extending axially in the direction of the rolling bearing from the large-diameter edge of the radial portion 122c. In this variant embodiment, the circumferential dimension of the ribs 150 is increased. This makes it possible to reinforce the stiffness of the support cap associated with this reinforcing insert 122.

Figure 19:
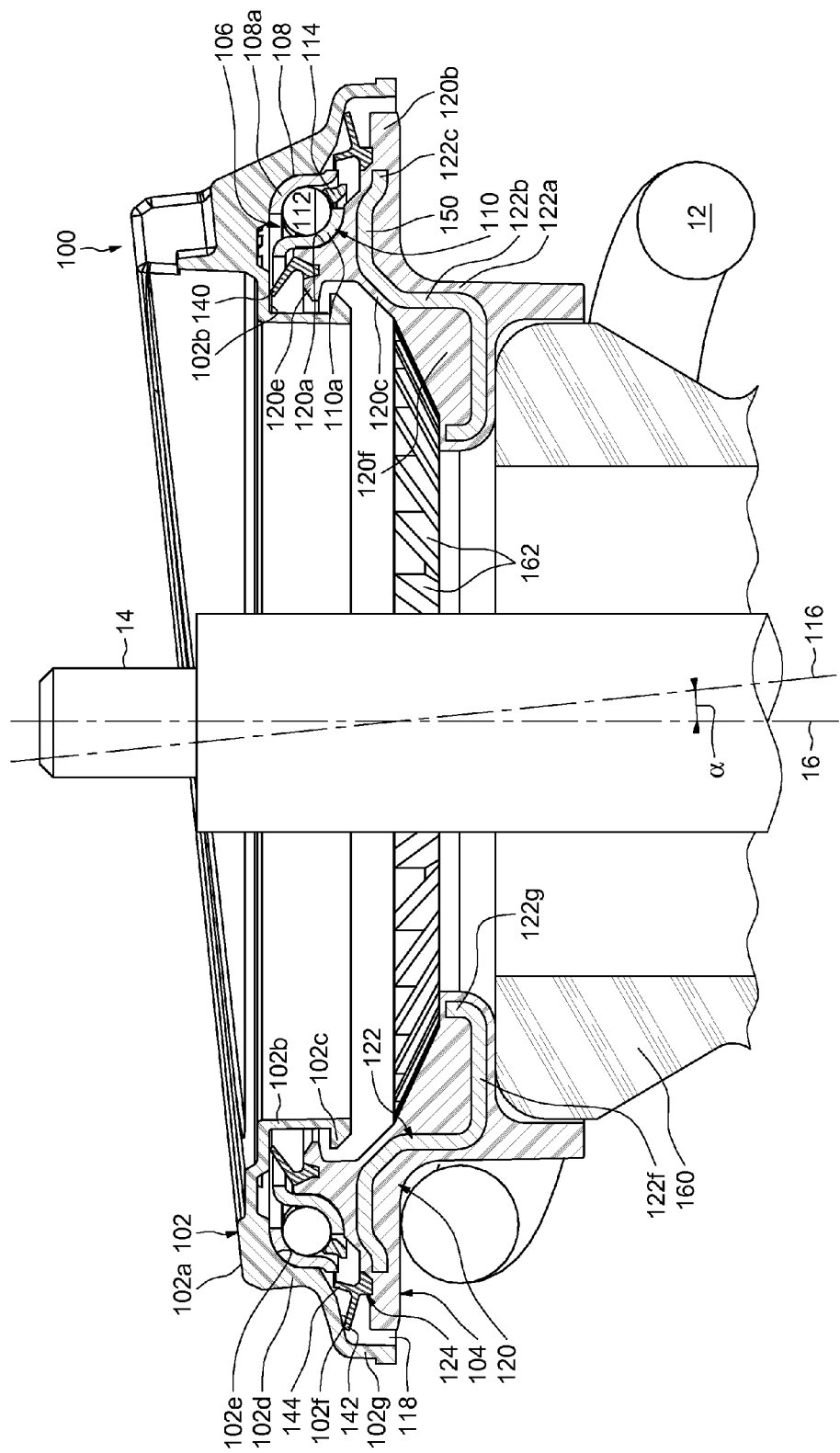
FIG. 19 is a view in axial section of a suspension thrust bearing device according to a seventh embodiment of the invention.
Figure 20:
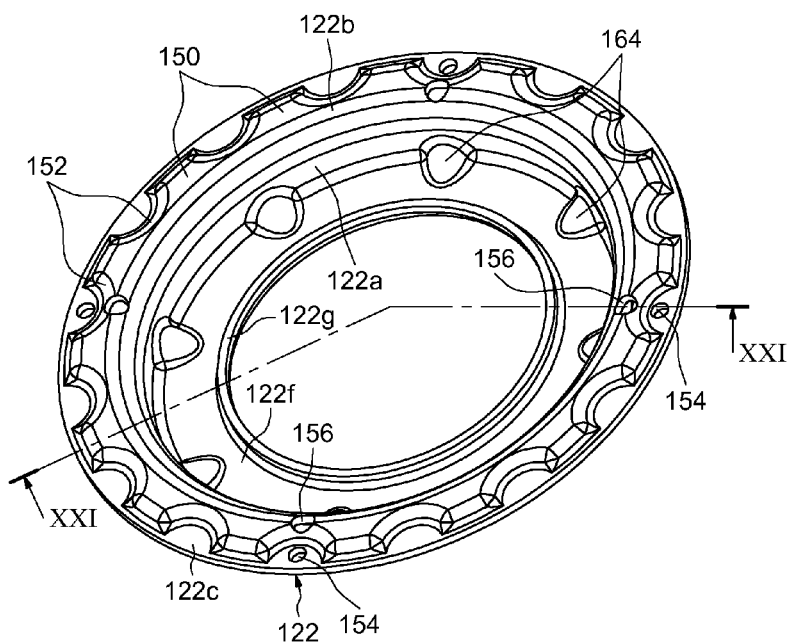
FIG. 20 is a perspective view of a reinforcing insert of the device of FIG. 19.
Figure 21:
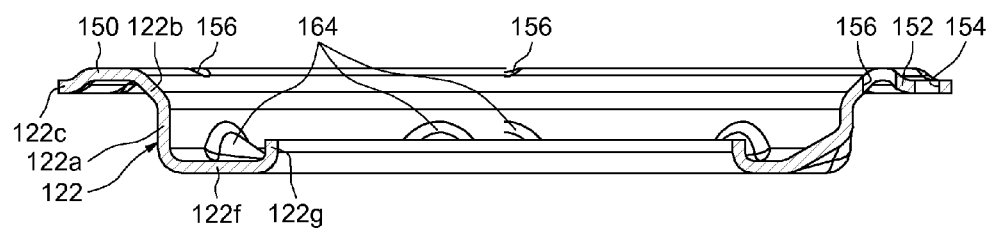
FIG. 21 is a view in section taken on the axis XXI-XXI of FIG. 20.

The embodiment illustrated in FIGS. 19 to 21, in which identical elements bear the same references, differs mainly from the fifth embodiment in that the reinforcing insert 122 comprises an annular radial collar 122f extending inwardly the lower end of the axial portion 122a, the inner edge of the said collar being extended axially upwards by a short annular axial portion 122g.

In this embodiment, the shape of the body 120 of the support cap 104 is also slightly modified. It comprises a radial portion 120f of relatively high thickness extending radially inwards a part of the bore of the skirt 120c. The lower surface of the radial portion 120f delimits a radial bearing surface for a shock-absorbing pad 160. The collar 122f and the axial portion 122g are entirely embedded inside the radial portion 120f of the body 120. They make it possible to reinforce the mechanical strength of the body 120 with respect to the axial forces exerted by the shock-absorbing pad. In this regard, reinforcing ribs 162 are also provided on the upper surface of the radial portion 120f and spaced with respect to one another in a regular manner in the circumferential direction.

For this purpose, the reinforcing insert 122 comprises stiffening ribs 164 obtained by local deformations of the collar 122f and of the axial portion 122a. The ribs 164 here number eight and are spaced in a regular manner in the circumferential direction. The spacing between two ribs 164 is here substantially equal to twice the spacing existing between two immediately adjacent ribs 150. The ribs 164 extend axially upwards and radially inwards. The upper edge of each rib 164 is connected to the axial portion 122a, the lower edge being connected to the radial collar 122f. In cross section, the ribs 164 extend substantially obliquely.

In the various embodiments described, the suspension thrust bearing devices comprise a cap of which the mechanical strength with respect to the forces exerted in particular by the suspension spring is improved by means of the use of a reinforcing insert made of a more rigid material than the body of the said cap and of which the shape and the thickness are adapted in the regions for taking up forces. In all the embodiments described, the reinforcing insert comprises a radial portion whose internal edge is extended directly or indirectly by an axial portion so as to have a cross section of a general L shape. However, it is possible, without departing from the scope of the present invention, to provide reinforcing inserts devoid of any axial portion and comprising only the radial portion from which stiffening ribs extend axially.

In the embodiments described, either the lower bearing cap or the upper support cap comprises a reinforcing insert. It is also possible to combine these two arrangements by providing a reinforcing insert for each of the lower bearing and upper support caps. In a variant, the reinforcing insert could also not be entirely embedded inside the body of the corresponding cap.

The invention claimed is:

1. A suspension thrust bearing device for a motor vehicle comprising:
   a rolling bearing forming a thrust bearing and provided with an upper ring, with a lower ring and with at least one row of rolling elements arranged between the rings, a bearing cap in contact with the upper ring, and a support cap in contact with the lower ring and forming a bearing assembly for a suspension spring, and wherein
   at least one of said caps having a body made of synthetic material and an insert covered at least in part by said body, and wherein
   the insert comprises stiffening ribs in order to reinforce the mechanical strength of said cap with respect to axial loads resulting from forces exerted by at least one of the suspension spring and by a shock-absorbing pad designed to bear against the support cap, and wherein
   the insert comprises a radial portion, and wherein
   the insert comprises an axial portion extending axially from the radial portion, and wherein
   the stiffening ribs extend radially inwardly from the axial portion of said insert in order to reinforce the mechanical strength of the cap with respect to the forces resulting from the shock-absorbing pad.

2. The device according to claim 1, in which the stiffening ribs extend axially towards the rolling bearing.

3. The device according to claim 1, wherein the stiffening ribs are connected to a radial or substantially radial collar extending inwardly from the axial portion.

4. The device according to claim 1, wherein the axial portion of the insert comprises, at a lower end, an annular rim extending radially inwards.

5. The device according to claim 1, wherein the radial portion of the insert comprises an annular peripheral rim extending axially towards the rolling bearing.

6. The device according to claim 1, in which the ribs are spaced with respect to one another in the circumferential direction.

7. The device according to claim 1, wherein an internal edge of the stiffening ribs is offset radially inwardly with respect to an internal edge of one of the upper ring or the lower ring bearing against the body of said cap.

8. The device according to claim 1, wherein the insert is made of metal material.

9. The device according to claim 1, wherein the insert is entirely embedded in the body of the cap.

10. A suspension thrust bearing device for a motor vehicle comprising:
    a rolling bearing forming a thrust bearing and provided with an upper ring, with a lower ring and with at least one row of rolling elements arranged between the rings, a bearing cap in contact with the upper ring, and a support cap in contact with the lower ring and forming a bearing assembly for a suspension spring, and wherein
    at least one of said caps having a body made of synthetic material and an insert covered at least in part by said body, and wherein
    the insert comprises stiffening ribs in order to reinforce the mechanical strength of said cap with respect to axial loads resulting from forces exerted by at least one of the suspension spring and by a shock-absorbing pad designed to bear against the support cap, and wherein the insert is made of synthetic material, and wherein the stiffening ribs have in cross section a profile similar to that of the surface of the cap against which one of the upper ring or the lower ring bears.

11. The device according to claim 7, wherein an external edge of the stiffening ribs is offset radially outwards with respect to an external edge of one of the upper ring or the lower ring bearing against the body of said cap.

* * * * *